United States Patent
Su (10) Patent No.: US 11,510,276 B2
(45) Date of Patent: Nov. 22, 2022

(54) LOW LATENCY BEAM ALIGNMENT

(71) Applicant: Apple Inc., Cupertino, CA (US)

(72) Inventor: Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 82 days.

(21) Appl. No.: 16/918,610

(22) Filed: Jul. 1, 2020

(65) Prior Publication Data

US 2021/0007173 A1 Jan. 7, 2021

Related U.S. Application Data (60) Provisional application No. 62/869,275, filed on Jul. 1, 2019.

(51) Int. Cl.
| | |
|---|---|
| H04W 76/28 | (2018.01) |
| H04W 72/04 | (2009.01) |
| H04L 1/16 | (2006.01) |
| H04B 7/06 | (2006.01) |
| H04W 72/12 | (2009.01) |
| H04L 27/26 | (2006.01) |

(52) U.S. Cl.
CPC .......... *H04W 76/28* (2018.02); *H04B 7/0626* (2013.01); *H04L 1/1657* (2013.01); *H04L 27/2613* (2013.01); *H04W 72/042* (2013.01); *H04W 72/1268* (2013.01)

(58) Field of Classification Search
CPC .. H04B 7/0626; H04W 76/28; H04W 72/042; H04W 72/1268; H04L 1/1657; H04L 27/2613

USPC .......................................................... 370/311

See application file for complete search history.

(56) References Cited

U.S. PATENT DOCUMENTS

| | | | |
|---|---|---|---|
| 2019/0053153 A1* | 2/2019 | Islam | H04L 5/0091 |
| 2019/0159280 A1* | 5/2019 | Chakraborty | H04W 76/28 |
| 2020/0008261 A1* | 1/2020 | Islam | H04W 52/0216 |
| 2020/0112917 A1* | 4/2020 | Nam | H04W 52/0235 |
| 2020/0260381 A1* | 8/2020 | Nam | H04W 76/28 |

* cited by examiner

*Primary Examiner* — Rownak Islam
(74) *Attorney, Agent, or Firm* — Fay Kaplun & Marcin, LLP (57) ABSTRACT

A user equipment (UE) establishes a connected discontinuous reception cycle including one or more onDurations with a currently camped base station. When the one or more onDurations is scheduled, the UE utilizes an active mode of processing and when the one or more onDurations are not scheduled the UE utilizes a sleep mode of inactivity. The UE receives an indication of a plurality of reference signals that are to be transmitted during a first onDuration, each reference signal is (i) to be included in a transmitter beam and (ii) associated with an uplink resource, receives a plurality of reference signals, each reference signal being associated with one of the transmitter beams, selects one of the plurality of transmitter beams based on measuring the included reference signal and transmits an indication of the selected one of the plurality of transmitter beams on the uplink resource associated with the included reference signal.

21 Claims, 6 Drawing Sheets

Scenario 85

Scenario 90

LOW LATENCY BEAM ALIGNMENT

PRIORITY/INCORPORATION BY REFERENCE

This application claims priority to U.S. Provisional Application 62/869,275 filed on Jul. 1, 2019 and entitled "Low Latency Beam Alignment," which is incorporated in its entirety herein.

BACKGROUND

A user equipment (UE) may establish a connection to at least one of a plurality of different networks or types of networks. In some networks, signaling between the UE and a base station of the network may occur over the millimeter wave (mmWave) spectrum. Signaling over the mmWave spectrum may be achieved by beamforming which is an antenna technique used to transmit or receive a directional signal. On the transmitting side, beamforming may include propagating a directional signal. A beamformed signal may be referred to as a transmitter beam. On the receiving side, beamforming may include configuring a receiver to listen in a direction of interest. The spatial area encompassed by the receiver when listening in a direction of interest may be referred to as a receiver beam.

Establishing and/or maintaining a communication link between the UE and the base station may include a process referred to as beam management. During beam management, a transmitter beam and a receiver beam are aligned. This may include the base station transmitting a plurality of transmitter beams and receiving feedback from the UE. Based on the this signaling exchange, the base station and the UE may configure a beam pair of a transmitter beam and a receiver beam that may be utilized for a downlink data transfer.

When the UE is configured with a beam pair, the UE may also be configured to utilize a connected discontinuous reception (C-DRX) cycle. The C-DRX cycle is a specification or schedule that includes a set of active processing time periods and a set of available sleep time periods. A scheduled active processing time period may be referred to as an onDuration. During an onDuration, the UE is configured to perform operations that enable the UE to receive data that may be transmitted to the UE. During a C-DRX cycle, when an onDuration is not scheduled, the UE has an opportunity to enter a sleep mode and conserve power.

For any of a variety of different reasons, when the UE is in a sleep mode the beam pair may become misaligned. As a result, when the UE enters an onDuration of the C-DRX cycle beam management may be initiated. However, conventional beam management techniques cause latency and may interfere with the intended power saving benefits of the C-DRX cycle.

SUMMARY

Some exemplary embodiments are related to a method performed b a user equipment (UE). The method includes establishing a connected discontinuous reception (C-DRX) cycle with a currently camped base station, the C-DRX cycle including one or more onDurations, wherein, when the one or more onDurations is scheduled, the UE is configured to utilize an active mode of processing and when the one or more onDurations are not scheduled the UE is configured to utilize a sleep mode of inactivity, receiving an indication of a plurality of reference signals that are to be transmitted to the UE during a first onDuration, wherein each of the plurality of reference signals are (i) to be included in a transmitter beam and (ii) associated with an uplink resource, receiving a plurality of reference signals, each of the plurality of reference signals being associated with one of a plurality of transmitter beams, selecting one of the plurality of transmitter beams based on measuring the included reference signal and transmitting an indication of the selected one of the plurality of transmitter beams on the uplink resource associated with the included reference signal.

Other exemplary embodiments are related to a user equipment (UE) having a transceiver and a processor. The transceiver is configured to camp on a base station of a first network operating on a first radio access technology (RAT). The processor is configured to establish a connected discontinuous reception (C-DRX) cycle with the currently camped base station, the C-DRX cycle including one or more onDurations, wherein, when the one or more onDurations is scheduled, the UE is configured to utilize an active mode of processing and, when the one or more onDurations are not scheduled, the UE is configured to utilize a sleep mode of inactivity, receive an indication of a plurality of reference signals that are to be transmitted to the UE during a first onDuration, wherein each of the plurality of reference signals are (i) to be included in a transmitter beam and (ii) associated with an uplink resource, receive a plurality of reference signals, each of the plurality of reference signals being associated with one of a plurality of transmitter beams, and select one of the plurality of transmitter beams based on measuring the included reference signal. The transmitter is further configured to transmit an indication of the selected one of the plurality of transmitter beams on the uplink resource associated with the included reference signal.

Still other exemplary embodiments are related to a method performed by a base station. The method includes establishing a connected discontinuous reception (C-DRX) cycle with a connected user equipment (UE), the C-DRX cycle including one or more onDurations, when the one or more onDurations is scheduled the UE is configured to utilize an active mode of processing and when the one or more onDurations are not scheduled the UE is configured to utilize a sleep mode of inactivity, transmitting an indication of a plurality of reference signals that are to be transmitted to the UE during a first onDuration, wherein each of the plurality of reference signals are (i) associated with one of a plurality of transmitter beams and (ii) associated with an uplink resource, transmitting each of the plurality of reference signals using the associated transmitter beams and receiving an indication of the selected one of the plurality of transmitter beams on the uplink resource associated with the included reference signal.

DETAILED DESCRIPTION

The exemplary embodiments may be further understood with reference to the following description and the related appended drawings, wherein like elements are provided with the same reference numerals. The exemplary embodiments describe a device, system and method to improve beam management by implementing a low latency beam alignment process.

The exemplary embodiments are described with regard to beamforming. A person of ordinary skill in the art would understand that beamforming is an antenna technique that is utilized to transmit or receive a directional signal. From the perspective of a transmitting device, beamforming may refer to propagating a directional signal. Throughout this description, a beamformed signal may be referred to as a transmitter beam. The transmitter beam may be generated by having a plurality of antenna elements radiate the same signal. Increasing the number of antenna elements radiating the signal decreases the width of the radiation pattern and increases the gain. As will be described below with regard to FIGS. 1A and 1B, a transmitter beam may vary in width and be propagated in any of a plurality of different directions.

From the perspective of a receiving device, beamforming may refer to tuning a receiver to listen to a direction of interest. Throughout this description, the spatial area encompassed by the receiver listening in the direction of interest may be referred to as a receiver beam. The receiver beam may be generated by configuring the parameters of a spatial filter on a receiver antenna array to listen in a direction of interest and filter out any noise from outside the direction of interest. As will be described below with regard to FIG. 1C, a receiver beam may also vary in width and be directed in any of a plurality of different areas of interest.

The exemplary embodiments are also described with regard to a user equipment (UE). However, the use of a UE is provided for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component that is capable of beamforming.

To access various services, the UE may communicate with a network via a base station. The exemplary embodiments are described with regard to the network being a 5G New Radio (NR) network and the base station being a next generation Node B (gNB). The 5G NR network may utilize the millimeter wave (mmWave) spectrum. The mmWave spectrum is comprised of frequency bands that each have a wavelength of 1-10 millimeters. The mmWave frequency bands may be located between, approximately, 10 gigahertz (GHz) and 300 GHz. However, the use of the 5G NR network and the gNB are provided for illustrative purposes. The exemplary embodiments may apply to any type of network and any type of base station within the corresponding network that are capable of beamforming.

To establish and/or maintain a communication link over the mmWave spectrum, the UE and the network may align a transmitter beam and a receiver beam using beam management. A person of ordinary skill in the art would understand that beam management may generally refer to a signaling exchange where control information is exchanged and subsequently, a beam pair (e.g., a transmitter beam and a receiver beam) that may be utilized for a data transfer is established. However, any reference to a transmitter beam, a receiver beam or beam management is for illustrative purposes. Different networks and/or entities may refer to similar concepts by different names.

When connected to the 5G NR network, the UE may also be configured with a connected discontinuous reception (C-DRX) cycle. The C-DRX cycle is a power saving mechanism that includes utilizing an active mode of data exchange processing and a sleep mode of inactivity. The UE may use the active mode of processing at defined intervals to perform scheduled operations such as performing measurements related to the network conditions, transmitting (e.g., requests, measurement reports, uplink data, etc.), and receiving (e.g. control channel information, reference signals, synchronization signals, downlink data, etc.). The time period that the UE may be scheduled to receive control channel information may be termed the onDuration for the C-DRX cycle. The onDuration relates to a duration over which the UE may perform operations that enable the UE to receive data that may be transmitted to the UE such as but not limited to, control channel information, an uplink grant, a downlink grant, reference signals, synchronization signals, payload data etc. During the C-DRX cycle, when an onDuration is not scheduled the UE may have an opportunity to utilize the sleep mode of inactivity and conserve power. However, reference to a C-DRX cycle is for illustrative purposes, different networks may refer to similar concepts by a different name. The exemplary embodiments may apply to any scenario in which the UE transitions between a power saving mode and an active mode with regard to data exchange processing.

The C-DRX cycle may have a predetermined duration N such as 100 milliseconds (ms), 50 ms, 40 ms, 20 ms, etc. For example, at a time 0, there may be a onDuration during which the active mode of processing is used. Subsequently, upon the conclusion of the onDuration, the UE has an opportunity to utilize the sleep mode of inactivity. Then at a time N, there may be another onDuration. Subsequently, the sleep mode is used until a time 2N. This process continues for the duration of the C-DRX cycle. Reference to the sleep mode of inactivity does not necessarily mean putting the processor, the transmitter, and the receiver of the UE to sleep, in hibernation, or in deactivation. For example, the processor (e.g., baseband and/or application processor) may continue to execute other applications or processes. The sleep mode relates to conserving power by discontinuing a continuous processing functionality relating to operations that enable the UE to receive data that may be transmitted to the UE and transmit data to the network. Further, reference to the C-DRX cycle being configured in ms units is merely for illustrative purposes, the exemplary embodiments may utilize a DRX cycle that is based on subframes or any other suitable unit of time.

Under conventional circumstances, the sleep mode of inactivity is likely to cause the beam pair to lose its alignment. For example, when the UE is in the sleep mode of inactivity, the UE may change its location relative to the currently camped base station or the UE may miss control information that is intended to be utilized to maintain the communication link between the UE and the base station. As a result, when the UE enters an onDuration of the C-DRX cycle, beam management may be initiated. However, conventional beam management techniques cause latency and interfere with the intended power saving benefits of the C-DRX cycle.

The exemplary embodiments relate to improving beam management by implementing a low latency beam alignment process. The exemplary embodiments will be described with regard to the low latency beam alignment process being performed during a C-DRX cycle. For example, prior to entering the sleep mode of inactivity the base station may indicate to the UE that when an onDuration is scheduled, the base station will transmit a plurality of transmitter beams for the UE to select. Each of the plurality of transmitter beams may be associated with an uplink resource. When the onDuration occurs, the UE provides feedback on the uplink resource associated with the selected transmitter beam. Subsequently, the base station will send downlink data on the selected transmitter beam. However, the exemplary embodiments are not limited to the C-DRX cycle and may apply to any scenario during which a beam pair is likely to become misaligned. This exemplary low latency beam alignment process may be used in conjunction with other currently implemented beam management techniques, future implementations of beam management techniques or independently from other beam management techniques.

Figure 1A:
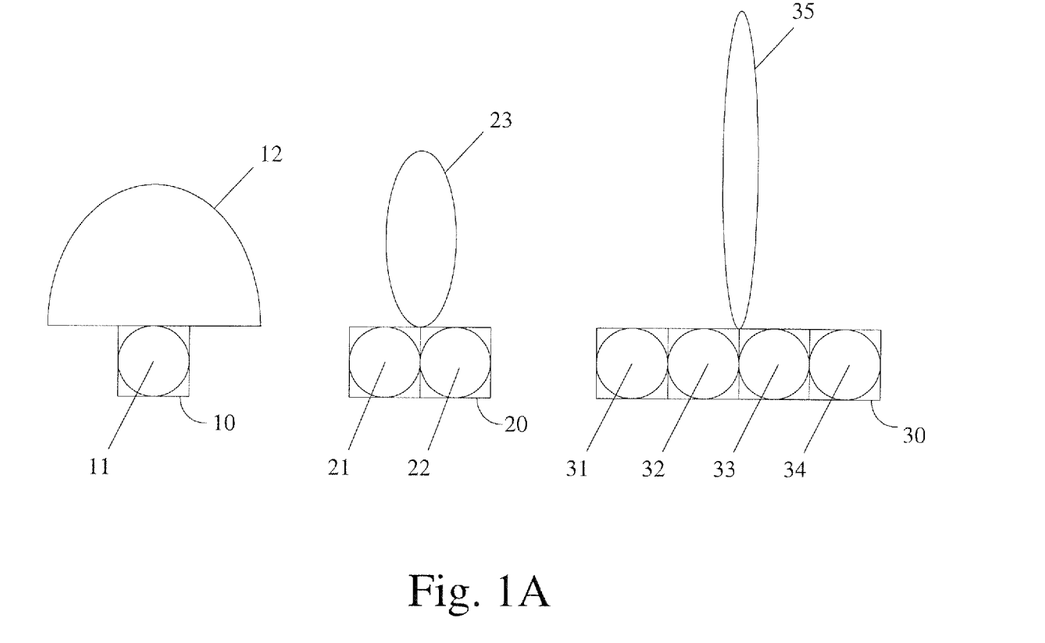
FIG. 1A shows an example of three antenna modules and their corresponding radiation patterns.

FIG. 1A shows an example of three antenna modules 10, 20, 30 and their corresponding radiation patterns 12, 23, 35. Antenna module 10 includes a single antenna element 11 and generates the exemplary radiation pattern 12. Antenna module 20 includes two antenna elements 21, 22 and generates the exemplary radiation pattern 23. Antenna module 30 includes four antenna elements 41-44 and generates the exemplary radiation pattern 35. A comparison of the radiation patterns 12, 23, 35 illustrates the effects the number of antenna elements has on the geometry of the radiation pattern. For instance, in this example, the radiation pattern 12 is the widest radiation pattern because the antenna module 10 has the fewest number of antenna elements (e.g., one). The antenna module 20 has two antenna elements 21, 22. The additional antenna element allows antenna module 20 to generate a radiation pattern 23 that is narrower than the radiation pattern 12. The antenna module 30 has four antenna elements 41-44. Thus, compared to antenna modules 10, 20, antenna module 30 has the most antenna elements. As a result, the antenna module 30 is able to generate a radiation pattern 35 that is narrower than the radiation patterns 12, 23 and provides the highest gain compared to the other antenna modules. Those skilled in the art will understand that the above examples assumed that each antenna element received the same input signal to generate the corresponding radiation patterns. In contrast, as will be described below, the phase and/or magnitude of the input signals that are provided to each antenna element may be used to control a direction of propagation of a transmitted beam.

A transmitter beam may be propagated in any of a plurality of different directions. The direction in which a transmitter beam is propagated may be based on the phase and/or magnitude of the signal provided to each antenna element of the antenna module. Thus, the antenna module may cover a particular area with a plurality of transmitter beams that are each propagated in a different direction by appropriately weighting the phase and/or magnitude of the signal provided to each antenna element for each transmitter beam.

Figure 1B:
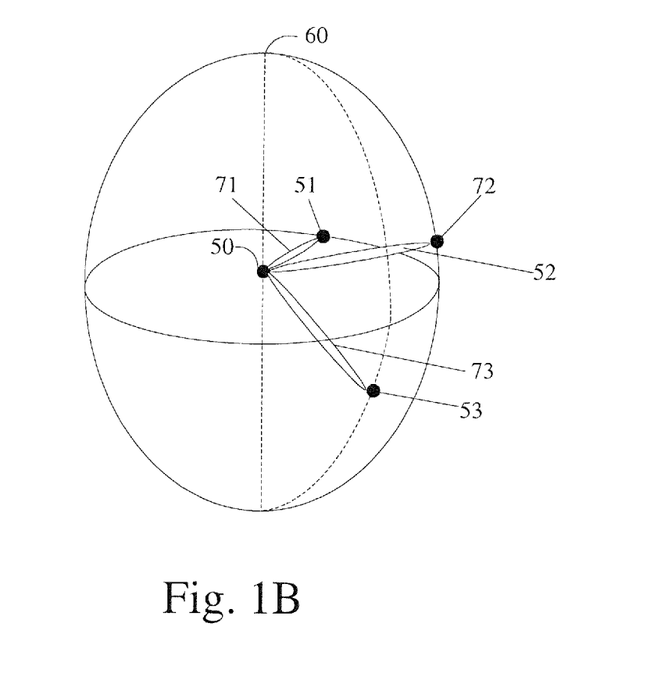
FIG. 1B shows an example of the directions in which an antenna module may propagate a beam.

FIG. 1B shows an example of the directions in which an antenna module 50 may propagate a transmitter beam. The antenna module 50 is located at the center of the spherical coordinate system 60 and represents a transmission point. Points 51, 52, 53 on the spherical coordinate system 60 each represent a different reception point. At a first time, the antenna elements of the antenna module 50 are provided with a first input signal to propagate transmitter beam 71 in the direction of reception point 51. The direction of transmitter beam 71 is generated based on the phase and/or magnitude of the signal provided to each antenna element of the antenna module 50. At a second time, the antenna elements of the antenna module 50 are provided with a second input signal to propagate transmitter beam 72 in the direction of the reception point 52. Similarly, the direction of transmitter beam 72 is generated based on the phase and/or magnitude of the signal provided to each antenna element of the antenna module 50. At a third time, the antenna elements of the antenna module 50 are provided with a third input signal to propagate transmitter beam 73 in the direction of the reception point 53. Again, the direction of transmitter beam 73 is generated based on the phase and/or magnitude of the signal provided to each antenna element of the antenna module 50. Thus, the antenna module 50 may deliver transmitter beams 71, 72, 73 to receptions points 51, 52, 53 from the same transmission point despite the reception points 51, 52, 53 each being located in different horizontal and vertical directions relative to the antenna element 50. The above example is merely provided for illustrative purposes. The exemplary embodiments may propagate a transmitter beam in any direction and control the direction of the transmitter beam in any appropriate manner.

Figure 1C:
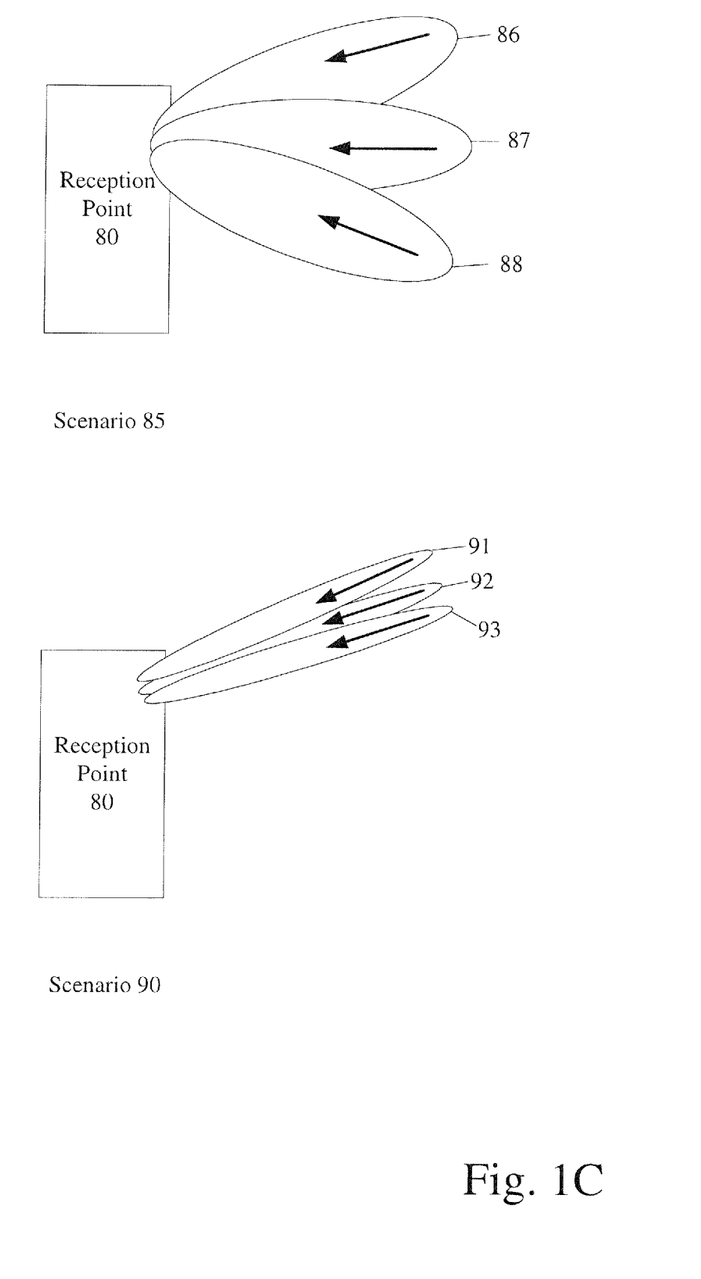
FIG. 1C shows examples of various receiver beam configurations.

FIG. 1C shows examples of various receiver beam configurations. As mentioned above, a receiver beam may be generated by configuring the parameters of a spatial filter on a receiver antenna array to listen for incoming signals from the direction of interest. Like the transmitter beam, the receiver beam may vary in width and be pointed in any direction.

There are two scenarios 85, 90 depicted in FIG. 1C. Scenario 85 shows a reception point 80 and three receiver beams 86, 87, 88. Each of the receiver beams 86, 87, 88 occur at a different time. For example, at a first time the reception point 80 may tune its receiver to generate the receiver beam 86. The width and angle of the receiver beam 86 may be based on the parameters of the spatial filter. Utilizing the receiver beam 86, the reception point 80 may receive signals incoming from this first direction of interest. Subsequently, at a second time, the reception point 80 may tune its receiver to generate the receiver beam 87. While the scenario 85 shows the receiver beams 86 and 87 being generally the same width, the angle of the receiver beam 87 is different than the angle of the receiver beam 86. Thus, with the receiver beam 87, the reception point 80 will receive signals incoming from this second direction of interest. At a third time, the reception point 80 may tune its receiver to generate the receiver beam 88. While the scenario 85 shows the receiver beams 86, 87, 88 being generally the same width, the angle of the receiver beam 88 is different than the angle of the receiver beam 86 and the receiver beam 87. Thus, with the receiver beam 88, the reception point 80 will receive signals incoming from this third direction of interest.

The link budget of a beam pair (e.g., transmitter beam and receiver beam) may correlate to the alignment and the width of the beam pair. At the reception point 80, beam management may include utilizing a plurality of receiver beams of different widths. For example, the receiver beams 86, 87, 88 may be used initially. Based on measurement data, one of the receiver beams 86, 87, 88 may be selected. Subsequently, the reception point 80 may utilize a plurality of narrower receiver beams in the general angular direction of the selected one of the receiver beams 86, 87, 88. Thus, the reception point 80 may initially utilize wider beams to search for incoming signals from a transmission point (not pictured). When an indication of the direction of the transmission point is identified, the reception point 80 may then utilize a plurality of narrower beams to establish a more precise alignment with the transmission point.

To provide an example, scenario 90 shows the reception point 80 utilizing three receiver beams 91, 92, 93 after the receiver beam 86 depicted in scenario 85 is selected based on measurement data. Like the receiver beams 86, 87, 88 depicted in scenario 85, each of the receiver beams 91, 92, 93 depicted in scenario 90 occur at a different time. For example, at a fourth time, the reception point 80 may tune its receiver to generate the receiver beam 91. At a fifth time, the reception point 80 may tune its receiver to generate the receiver beam 92. At a sixth time, the reception point 80 may tune its receiver to generate receiver beam 93. Subsequently, the reception point 80 may select one of the receiver beams 91, 92, 93 to receive signals via a transmission beam.

FIGS. 1A-1C are not intended to limit the exemplary embodiments to any particular beamforming techniques. Instead, FIGS. 1A-1C are provided to demonstrate that beamforming may include transmitter beams of various widths that may be propagated in any direction and receiver beams of various widths that may be pointed in any direction. The exemplary embodiments may apply to a transmitter beam and a receiver beam being generated in any appropriate manner.

Figure 2:
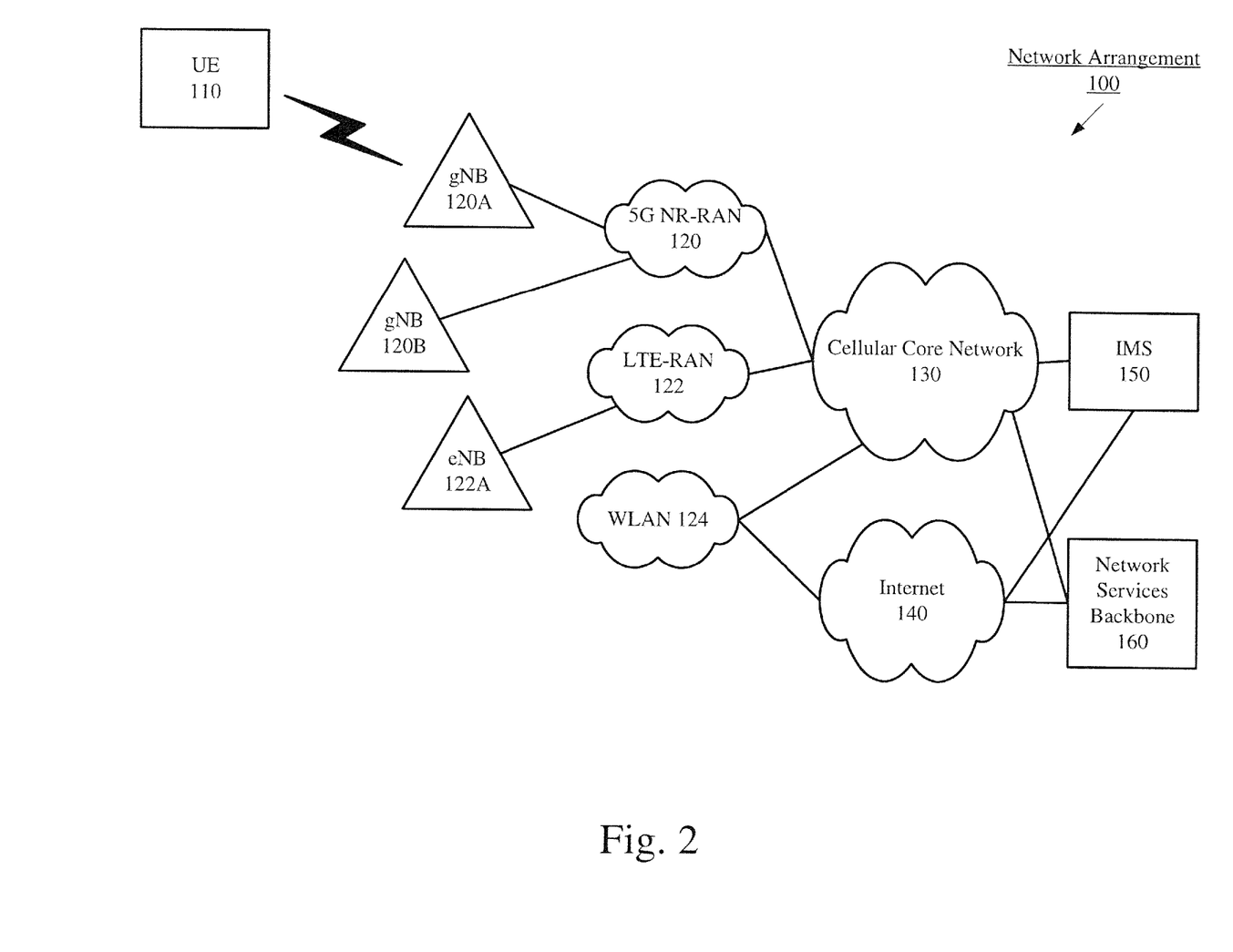
FIG. 2 shows an exemplary network arrangement according to various exemplary embodiments.

FIG. 2 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, a LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via the gNB 120A. As mentioned above, the exemplary embodiments are related to mmWave functionality. Accordingly, the gNB 120A may be configured with the necessary hardware (e.g., antenna array), software and/or firmware to perform massive multiple in multiple out (MIMO) functionality. Massive MIMO may refer to a base station that is configured to generate a plurality of transmitter beams and a plurality of receiver beams for a plurality of UEs. During operation, the UE 110 may be within range of a plurality of gNBs. Thus, either simultaneously or alternatively, the UE 110 may also connect to the 5G NR-RAN via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 3:
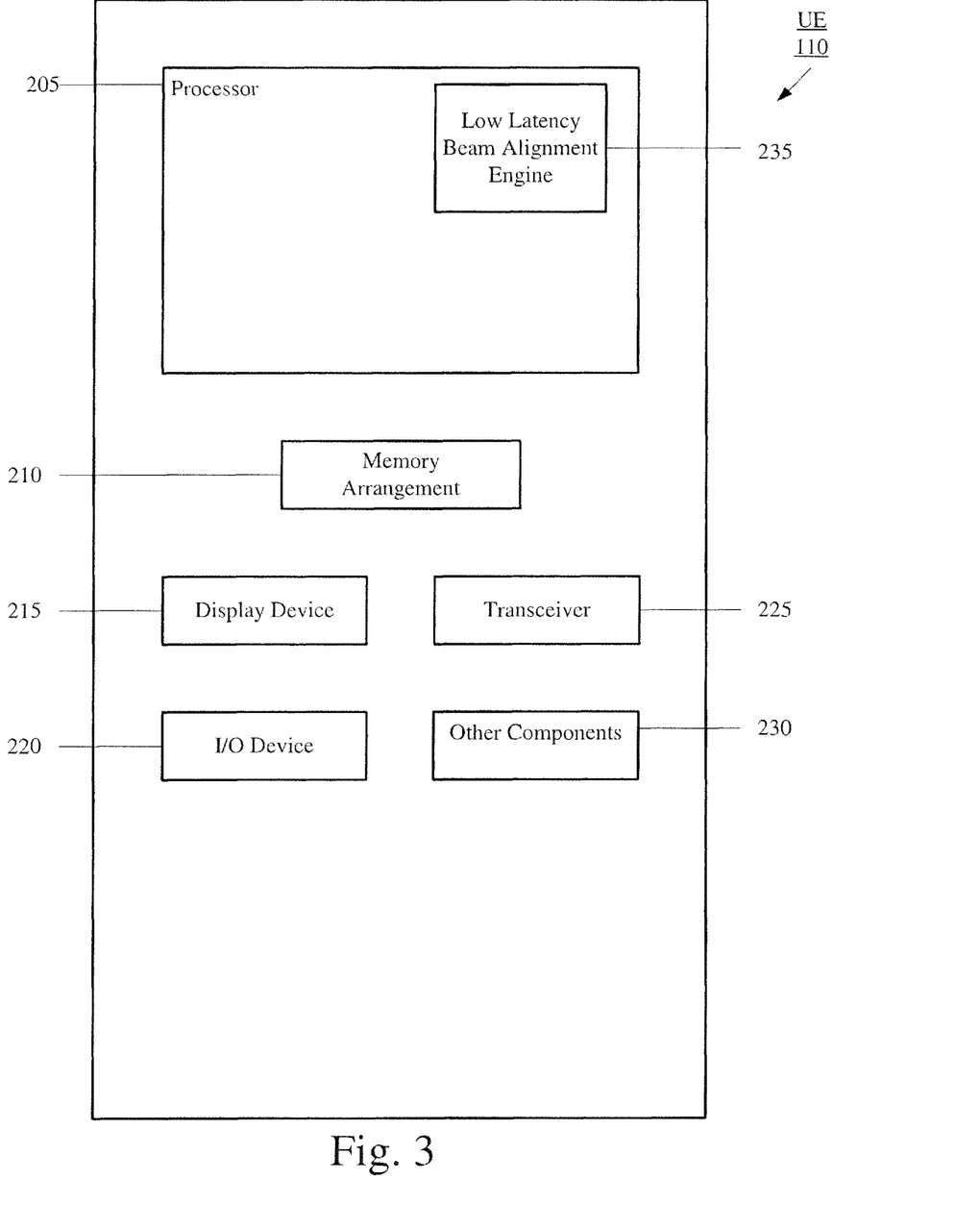
FIG. 3 shows an exemplary UE according to various exemplary embodiments.

FIG. 3 shows an exemplary UE 110 according to various exemplary embodiments. The UE 110 will be described with regard to the network arrangement 100 of FIG. 2. The UE 110 may represent any electronic device and may include a processor 205, a memory arrangement 210, a display device 215, an input/output (I/O) device 220, a transceiver 225, an antenna panel 230 and other components 235. The other components 235 may include, for example, an audio input device, an audio output device, a battery that provides a limited power supply, a data acquisition device, ports to electrically connect the UE 110 to other electronic devices, etc.

The processor 205 may be configured to execute a plurality of engines of the UE 110. For example, the engines may include a low latency beam alignment engine 235. The low latency beam alignment engine 235 may be configured to associate a particular uplink resource with each of a plurality of transmitter beams. During an onDuration, the low latency beam alignment engine 235 may select one of the transmitter beams and provide feedback on the uplink resource associated with the selected transmitter beam. This may indicate to the currently camped base station that downlink communication is to resume via the selected transmitter beam.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

The UE 110 may be configured to be in one of a plurality of different operating states. One operating state may be characterized as RRC idle state, another operating state may be characterized as RRC inactive state and another operating state may be characterized as RRC connected state. RRC refers to the radio resource control (RRC) protocols. Those skilled in the art will understand that when the UE 110 is in RRC connected state, the UE 110 and the 5G NR-RAN 120 may be configured to exchange information and/or data. The exchange of information and/or data may allow the UE 110 to perform functionalities available via the network connection. Further, those skilled in the art will understand that when the UE 110 is connected to the 5G NR-RAN 120 and in RRC idle state the UE 110 is generally not exchanging data with the network and radio resources are not being assigned to the UE 110 within the network. In RRC inactive state, the UE 110 maintains an RRC connection while minimizing signaling and power consumption. However, when the UE 110 is in RRC idle state or RRC inactive state, the UE 110 may monitor for information and/or data transmitted by the network. Throughout this description these terms are being used generally to describe states the UE 110 may be in when connected to any network and that exhibit the characteristics described above for the RRC idle, RRC connected and RRC inactive states.

The UE 110 may be configured to initiate beam management in any RRC operating state. For example, when the UE 110 is camped on a base station of the corresponding network in an RRC idle state or in an RRC inactive state, the UE 110 may not be able to receive data from the network. To receive beamformed communications in the downlink direction, the UE 110 may transition to the RRC connected state. This may include establishing a beam pair between the UE 110 and the currently camped base station.

Figure 4:
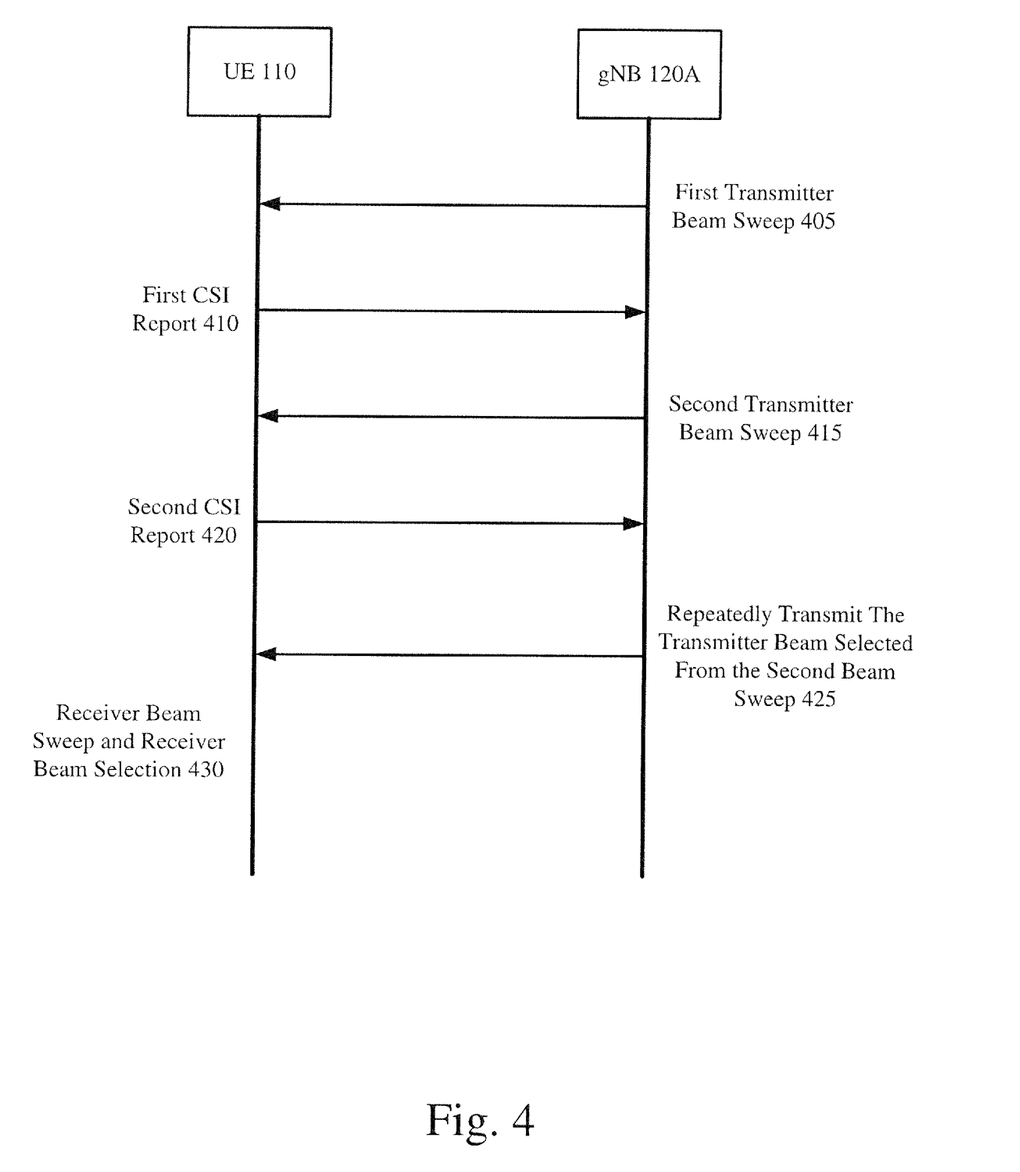
FIG. 4 shows an exemplary signaling diagram for the UE and the currently camped base station to perform conventional beam management according to various exemplary embodiments.

The exemplary embodiments relate to a low latency beam alignment process that may be performed when a beam pair is likely to lose its alignment. FIG. 4 is provided below as an example of how a beam pair may be initially aligned. However, the exemplary embodiments are not limited to the beam pair being initially aligned in accordance with any particular beam management technique. The exemplary embodiments may apply to a beam pair that is initially aligned in any appropriate manner.

FIG. 4 shows an exemplary signaling diagram 400 for the UE 110 and the currently camped base station to perform conventional beam management. FIG. 4 will be described with regard to the network arrangement 100 of FIG. 2 and the UE 110 of FIG. 3.

In 405, the gNB 120A may perform a first transmitter beam sweep. The transmitter beam sweep refers to transmitting a plurality of transmitter beams over a particular spatial area during a predetermined duration. The transmitter beam sweep may be performed as part of RRC connection establishment. Each beam transmitted during a transmitter beam sweep may include a reference signal. The UE 110 may then measure each transmitter beam based on their respective reference signals. The UE 110 may then select one of the transmitter beams based on the measurement data.

In 410, the UE 110 may transmit a first channel state information (CSI) report to the gNB 120A. The CSI report may indicate which transmitter beam included in the first transmitter beam sweep was selected by the UE 110. The first transmitter beam sweep and subsequent selection by the UE 110 (e.g., 405, 410) may be referred to as beam selection.

In 415, a second transmitter beam sweep may be performed by the gNB 120A. Compared to the first transmitter beam sweep, the second transmitter beam sweep may include narrower transmitter beams being transmitted over a narrower spatial area. The spatial area covered by the second transmitter beam sweep is based on the transmitter beam selected from the first transmitter beam sweep. The UE 110 may measure each transmitter beam included in the second transmitter beam sweep based on their respective reference signals. The UE 110 may then select a transmitter beam from the second transmitter beam sweep based on the measurement data.

In 420, the UE 110 may transmit a second CSI report to the gNB 120A to indicate to the gNB 120A which transmitter beam included from the second transmitter beam sweep was selected by the UE 110. The second transmitter beam sweep and subsequent selection by the UE 110 (e.g., 415, 420) may be referred to as transmitter beam refinement.

In 425, the gNB 120A repeatedly transmits the transmitter beam selected from the second transmitter beam sweep. In 430, the UE 110 performs a receiver beam sweep relative to the spatial area of the selected transmitter beam. A receiver beam sweep refers to generating a plurality of receiver beams over a particular spatial area during a predetermined duration. Based on measurement data collected by the UE 110 during the receiver beam sweep, the UE 110 may select a receiver beam. The receiver beam sweep and subsequent receiver beam selection may be referred to as receiver beam refinement. The refined transmitter beam and the refined receiver beam may form the beam pair that is to be utilized to provide the UE 110 with a downlink data transfer.

During operation, the UE 110 may be configured with a C-DRX cycle. For example, if no data is received for a predetermined amount of time, the UE 110 and the gNB 120A may configure a C-DRX cycle to conserve power at the UE 110. During the sleep mode of inactivity of the C-DRX cycle, the refined transmitter beam and the refined receiver beam of the beam pair are likely to become misaligned. As a result, beam management may be initiated. However, conventional beam management techniques, like the one shown in FIG. 4, cause latency and may interfere with the intended power saving purpose of the C-DRX cycle. Since the beam pair is likely to become misaligned due to the C-DRX cycle, the UE 110 and the gNB 120A may perform the exemplary low latency beam alignment process when an onDuration occurs.

Figure 5:
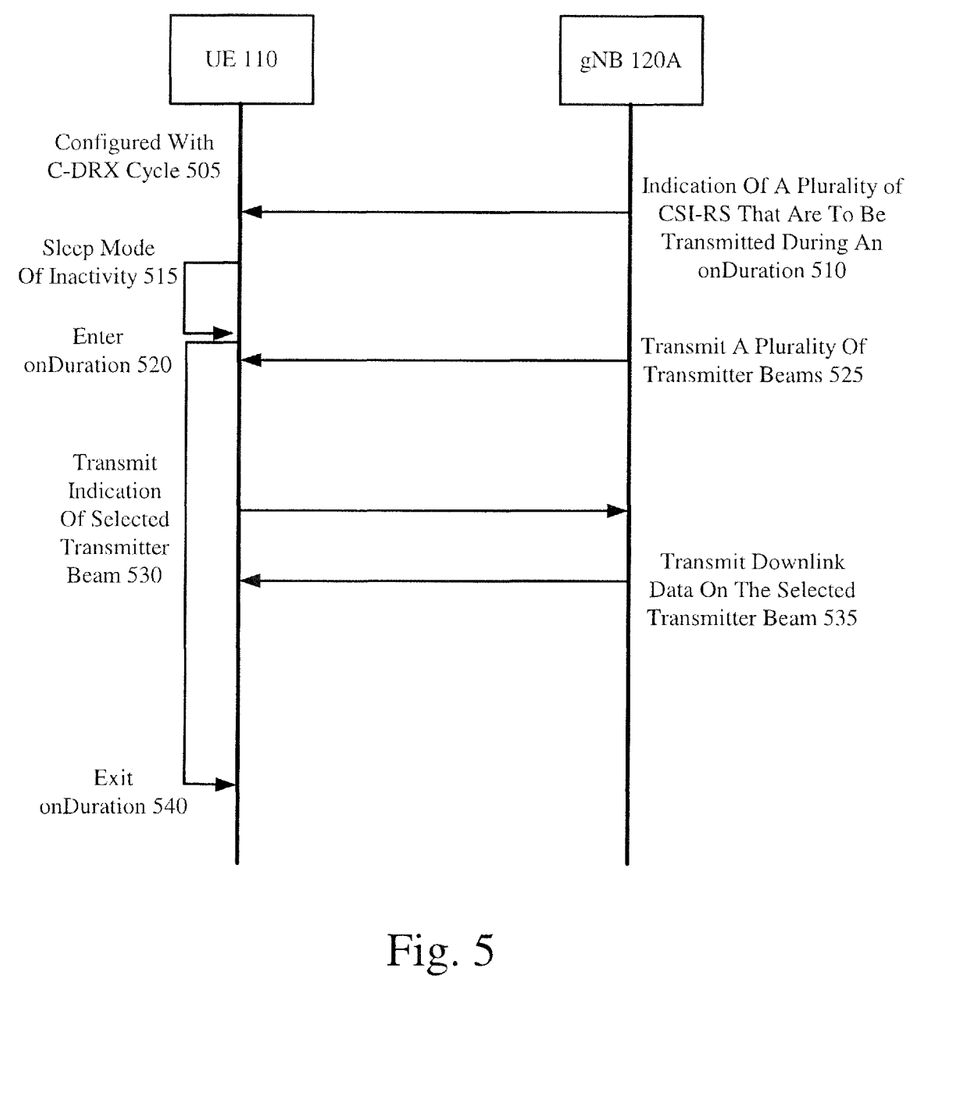
FIG. 5 shows an exemplary signaling diagram for the UE and the currently camped base station to perform low latency beam alignment according to various exemplary embodiments.

FIG. 5 shows an exemplary signaling diagram 500 for the UE 110 and the currently camped base station to perform low latency beam alignment. FIG. 5 will be described with regard to the network arrangement 100 of FIG. 2, the UE 110 of FIG. 3 and the signaling diagram 400 of the FIG. 4.

Consider the following exemplary scenario, the signaling diagram 400 has been performed. Accordingly, the UE 110 and the gNB 120A have established a beam pair by aligning a refined transmitter beam and a refined receiver beam.

In 505, a predetermined condition occurs that triggers the UE 110 and the gNB 120A to configure the UE 110 with a C-DRX cycle. For example, the C-DRX cycle may be configured when no data is transmitted to the UE 110 for a predetermined amount of time.

In 510, the UE 110 may a receive an indication of a plurality of reference signals that are to be transmitted to the UE 110 during an onDuration. The UE may receive the indication of the plurality of reference signals prior to entering the sleep mode of inactivity in accordance with the C-DRX cycle configured in 505. For example, the UE 110 may receive information from the gNB 120A that identifies a set of channel state information reference signals (CSI-RS). Each CSI-RS may be associated with both a transmitter beam that is to be transmitted to the UE 110 during the onDuration for beam alignment purposes and an uplink resource. As will be described below, the UE 110 may then select one of the plurality of transmitter beams and provide a response on the associated uplink resource. Subsequently, the UE 110 may receive payload data via the selected transmitter beam.

The longer the C-DRX cycle, the more severe the misalignment of the beam pair may become. Accordingly, the number of CSI-RS in the set may be based on a length of the C-DRX cycle. Thus, the longer the C-DRX cycle, the more CSI-RS and associated transmitter beams may be provided to the UE 110 for beam alignment purposes. However, this is merely exemplary, the number of CSI-RS may be based on any appropriate factor.

In 515, the UE 110 enters the sleep mode of inactivity in accordance with the C-DRX cycle configured in 505. In 520, the UE 110 wakes up and enters the onDuration in accordance with the C-DRX cycle configured in 505. In anticipation of the plurality of transmitter beams the UE 110 may adjust the parameters of its spatial filter to widen its receiver beam from its currently refined receiver beam when the UE 110 enters the scheduled onDuration.

In 525, the gNB 120A may transmit a plurality of transmitter beams to the UE 110. Each transmitter beam may include one of the plurality of CSI-RS sent to the UE 110 in 510. Due to the configuration of the spatial filter, the UE 110 may not receive the signals associated with all of the transmitter beams transmitted by the gNB 120A in 525. Subsequently, the UE 110 detects the CSI-RS received via the widened receiver beam. The UE 110 may then select one of the transmitter beams corresponding to the received CSI-RS based on measurement data. For example, the UE 110 may determine layer 1 reference signal received power (L1-RSRP) based on the received CSI-RS. The transmitter beam associated with the CSI-RS that provided the highest L1-RSRP may be selected by the UE 110.

In 530, the UE 110 may transmit an indication of the selected transmitter beam to the gNB 120A. For example, in one embodiment the indication may be explicitly transmitted as a CSI-RS resource indicator (CRI) on the uplink resource associated with the CSI-RS. In another embodiment, the indication may be implicitly indicated by using the uplink resource associated with the CSI-RS to transmit an acknowledgement (ACK) or UL scheduling request (SR) on the physical uplink control channel (PUCCH). However, reference to CRI, ACK and UL SR are for illustrative purposes. The exemplary embodiments may utilize any appropriate indication to identify which transmitter beam has been selected by the UE 110. As mentioned above, the association between the CSI-RS and the uplink resource may be provided to the UE 110 in 510. For example, the uplink resource may identify a particular physical PUCCH. In some exemplary embodiments, the CRI may be sent over the PUCCH via beamforming. In other exemplary embodiments, the PUCCH may correspond to the LTE-RAN 122. For example, the UE 110 may be in a non-stand alone (NSA) mode during which uplink control information is configured to be transmitted over the LTE-RAN 122.

In 535, the gNB 120A selects the transmitter beam based on the indication received from the UE 110 in 525 and sends downlink data to the UE 110 on the selected transmitter beam. Based on the selected transmitter beam, the widened receiver beam may be refined. Accordingly, the transmitter beam of the gNB 120A and the receiver beam of the UE 110 are aligned.

In 540 the onDuration ends and the UE 110 may enter the sleep mode of inactivity. In some exemplary embodiments when a subsequent onDuration is scheduled, another low latency beam alignment process may be performed that utilizes the same CSI-RS transmitted to the UE 110 in 505. In other exemplary embodiments, a new set of CSI-RS may be provided to the UE 110 before the onDuration ends in 540.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A method, comprising:
at a user equipment (UE):
establishing a connected discontinuous reception (C-DRX) cycle with a currently camped base station, the C-DRX cycle including one or more onDurations, wherein, when the one or more onDurations is scheduled, the UE is configured to utilize an active mode of processing and when the one or more onDurations are not scheduled the UE is configured to utilize a sleep mode of inactivity;
receiving an indication of a plurality of reference signals that are to be transmitted to the UE during a first onDuration, wherein each of the plurality of reference signals are (i) to be included in a transmitter beam and (ii) associated with an uplink resource;
receiving the plurality of reference signals, each of the plurality of reference signals being associated with one of a plurality of transmitter beams;
selecting one of the plurality of transmitter beams based on measuring the included reference signal; and
transmitting an indication of the selected one of the plurality of transmitter beams on the uplink resource associated with the included reference signal.

2. The method of claim 1, wherein the UE receives downlink data from the currently camped base station via the selected one of the plurality of transmitter beams.

3. The method of claim 1, wherein the indication of the selected one of the plurality of transmitter beams is one of a channel station information reference signal (CSI-RS) resource indication (CRI), an acknowledgement (ACK) or a uplink scheduling request (SR).

4. The method of claim 1, wherein the transmitting an indication of the selected one of the plurality of transmitter beams is transmitted to one of (i) the currently camped basestation or (ii) a base station of a different radio access technology (RAT) than the currently camped base station.

5. The method of claim 1, wherein the reference signals comprise channel state information reference signals (CSI-RS).

6. The method of claim 1, wherein a number of transmitter beams is based on, at least, a length of the C-DRX cycle.

7. The method of claim 1, wherein a number of reference signals is based on, at least, a length of the C-DRX cycle.

8. The method of claim 1, wherein the measuring the included reference signal comprises measuring a layer 1 reference signal received power (L1-RSRP).

9. A user equipment (UE), comprising:
a transceiver configured to camp on a base station of a first network operating on a first radio access technology (RAT); and
a processor configured to:
establish a connected discontinuous reception (C-DRX) cycle with the currently camped base station, the C-DRX cycle including one or more onDurations, wherein, when the one or more onDurations is scheduled, the UE is configured to utilize an active mode of processing and, when the one or more onDurations are not scheduled, the UE is configured to utilize a sleep mode of inactivity,
receive an indication of a plurality of reference signals that are to be transmitted to the UE during a first onDuration, wherein each of the plurality of reference signals are (i) to be included in a transmitter beam and (ii) associated with an uplink resource,
receive a plurality of reference signals, each of the plurality of reference signals being associated with one of a plurality of transmitter beams, and
select one of the plurality of transmitter beams based on measuring the included reference signal,
wherein the transmitter is further configured to transmit an indication of the selected one of the plurality of transmitter beams on the uplink resource associated with the included reference signal.

10. The UE of claim 9, wherein the UE receives downlink data from the currently camped base station via the selected one of the plurality of transmitter beams.

11. The UE of claim 9, wherein the indication of the selected one of the plurality of transmitter beams is one of a channel station information reference signal (CSI-RS) resource indication (CRI), an acknowledgement (ACK) or a uplink scheduling request (SR).

12. The UE of claim 9, wherein the transmitting an indication of the selected one of the plurality of transmitter beams is transmitted to one of (i) the currently camped base station or (ii) a base station of a different RAT than the currently camped base station.

13. The UE of claim 9, wherein the reference signals comprise channel state information reference signals (CSI-RS).

14. The UE of claim 9, wherein a number of transmitter beams is based on, at least, a length of the C-DRX cycle.

15. The UE of claim 9, wherein a number of reference signals is based on, at least, a length of the C-DRX cycle.

16. The UE of claim 9, wherein the measuring the included reference signal comprises measuring a layer 1 reference signal received power (L1-RSRP).

17. A method, comprising:
at a base station:
establishing a connected discontinuous reception (C-DRX) cycle with a connected user equipment (UE), the C-DRX cycle including one or more onDurations, when the one or more onDurations is scheduled the UE is configured to utilize an active mode of processing and when the one or more onDurations are not scheduled the UE is configured to utilize a sleep mode of inactivity;
transmitting an indication of a plurality of reference signals that are to be transmitted to the UE during a first onDuration, wherein each of the plurality of reference signals are (i) associated with one of a plurality of transmitter beams and (ii) associated with an uplink resource;
transmitting each of the plurality of reference signals using the associated transmitter beams; and
receiving an indication of the selected one of the plurality of transmitter beams on the uplink resource associated with the included reference signal.

18. The method of claim 17, wherein the base station transmits downlink data to the UE via the selected one of the plurality of transmitter beams.

19. The method of claim 17, wherein the indication of the selected one of the plurality of transmitter beams is one of a channel station information reference signal (CSI-RS) resource indication (CRI), an acknowledgement (ACK) or an uplink scheduling request (SR).

20. The method of claim 17, wherein one of a number of transmitter beams or a number of reference signals is based on, at least, a length of the C-DRX cycle.

21. The method of claim 17, wherein the reference signals comprise channel state information reference signals (CSI-RS).

\* \* \* \* \*